United States Patent

[11] 3,573,351

[72] Inventor Roy M. Elwood
6008 Moeller Road, Box 151, Fort Wayne, Ind. 46806

[21] Appl. No. 676,282
[22] Filed Oct. 18, 1967
[45] Patented Apr. 6, 1971

[54] COLOR BURST CIRCUIT FOR A COLOR TELEVISION RECEIVER
10 Claims, 2 Drawing Figs.

[52] U.S. Cl. 178/5.4, 178/69.5
[51] Int. Cl. H04n 9/46
[50] Field of Search 178/5.4, 5.4 (Sync), 69.5 (CB)

[56] References Cited

UNITED STATES PATENTS 3,248,478 4/1966 Breimer 178/69.5(CB)
3,251,930 5/1966 True 178/5.4(Sync)

*Primary Examiner*—Richard Murray
*Attorney*—Hood, Gust and Irish

ABSTRACT: A crystal which serves as a ringing circuit has coupled thereto by means of a diode a composite video signal which contains the color synchronizing burst. Connected to the crystal and the diode are gating pulses which are in time coincidence with the color burst. These gating pulses render the aforesaid diode conductive during the occurrence of only the color synchronizing burst, the diode being nonconductive during the intervals between the gating pulses.

A second diode is connected to the junction between the first diode and the crystal and is rendered nonconductive during the occurrence of the gating pulses but is conductive at all other times.

A limiting amplifier is connected to the crystal and contains circuitry which maintains the output signal thereof at a constant level even though the wave train from the crystal may vary in amplitude.

INVENTOR
ROY M. ELWOOD
BY Wood, Herron & Evans
ATTORNEYS

COLOR BURST CIRCUIT FOR A COLOR TELEVISION RECEIVER

BACKGROUND OF THE INVENTION

1. Field of the Invention

The invention generally relates to color television receivers and more particularly to a simplified circuit for generating a color subcarrier for the purpose of recovering color information.

2. Description of the Prior Art.

In the standard color television system, the transmitted video signal includes a brightness signal, a color subcarrier, the usual horizontal and vertical synchronizing pulses and blanking pulses, and burst of at least eight cycles of the color subcarrier frequency at a standard phase following each of the horizontal synchronizing pulses. The color subcarrier is phase modulated in accordance with hue, and amplitude modulated in accordance with the purity of the color or its degree of saturation. In the receiver, the color information is recovered from the color subcarrier by means of a phase and amplitude detector arrangement. The quality of reproduction in the receiver is dependent upon the provision of a reference wave having a frequency identical with the frequency of the subcarrier and the same phase as the subcarrier. The reference wave is derived in the receiver from the bursts following the horizontal synchronizing pulses.

In prior art circuits, it has been necessary to use in connection with a crystal-ringing circuit a crystal-ringing coil, a crystal-tuning coil, and a 3.58 megacycle trap located in the grid circuit of the burst gate. The burst gate conventionally has its output circuit connected to the crystal-ringing circuit.

SUMMARY OF THE INVENTION

In accordance with the broader aspects of this invention, the aforementioned crystal-ringing and tuning coils are eliminated, as well as the 3.58 megacycle trap. Other than this, this invention provides for overall circuit simplicity, coupled with greater operational stability and reliability.

It is an object of this invention to provide a color burst circuit for color television receivers which is simpler and provides for greater stability and reliability than prior art circuits.

It is another object of this invention to provide a color burst circuit for color television receivers wherein diodes are used for performing gating and shunting functions in such a way as to provide for overall circuit simplification as contrasted with prior art circuits.

BRIEF DESCRIPTION OF THE DRAWINGS

The above-mentioned and other features and objects of this invention and the manner of attaining then will become more apparent and the invention itself will be best understood by reference to the following description of embodiments of the invention taken in conjunction with the accompanying drawings, wherein.

DESCRIPTION OF THE PREFERRED EMBODIMENT

Figures 1, 2:
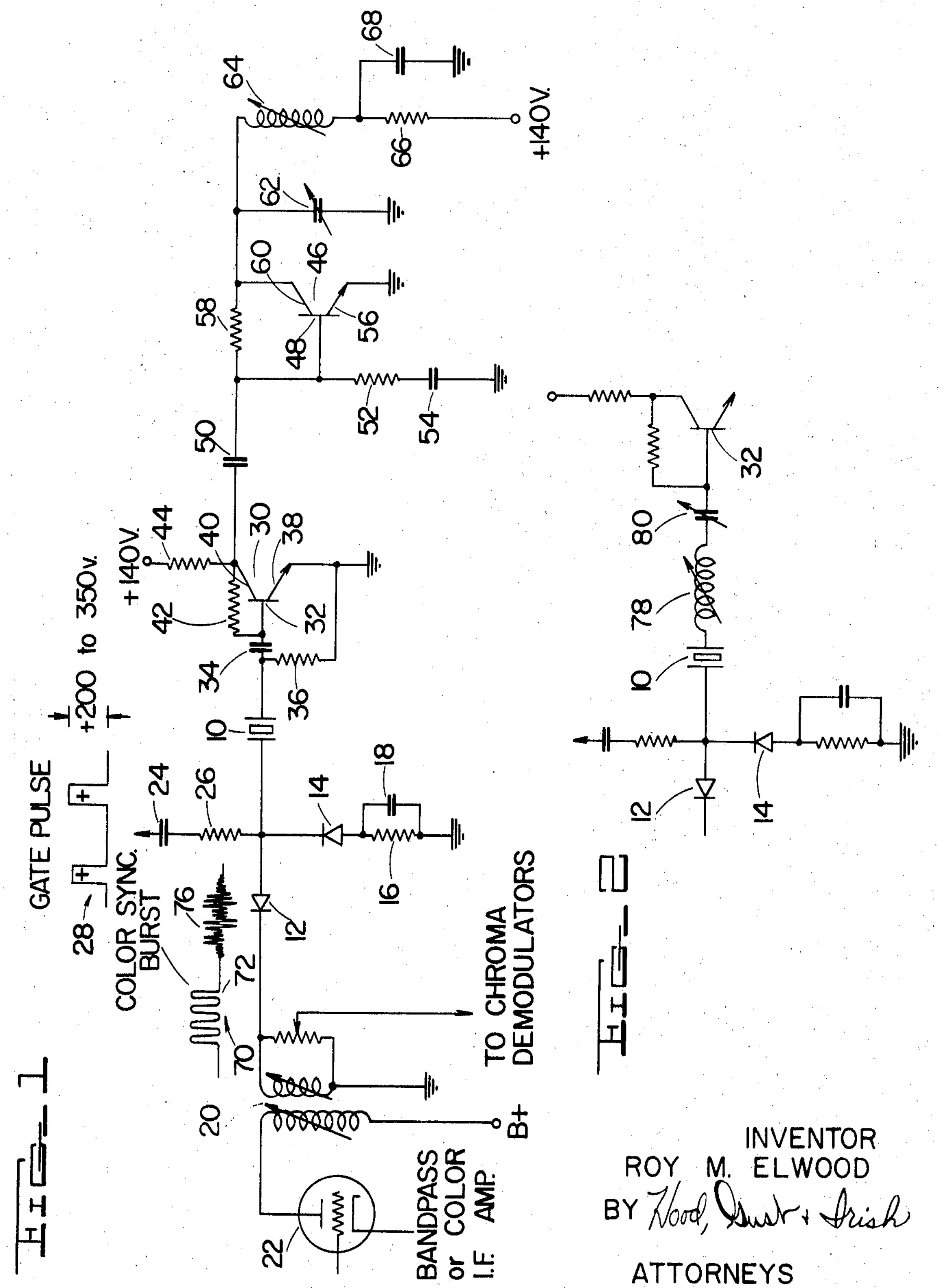
FIG. 1 is a circuit diagram of one embodiment of this invention.
FIG. 2 is a partial circuit diagram of another embodiment.

Referring to the drawings, a conventional ringing crystal 10 is precut and mounted to oscillate at the frequency of the color synchronizing burst, namely 3.58 megacycles. Connected to one plate of crystal 10 is a first diode 12 and a second diode 14. The anode of the diode 12 and the cathode of the diode 14 are connected together as shown, the diode 14 having its anode coupled to ground by means of a resistor 16 and shunt-connected capacitor 18. To the cathode of the diode 12 is connected the output circuit of a transformer, generally indicated by the numeral 20, of a conventional band-pass or color intermediate frequency amplifier 22 as shown.

A control signal, in the form of a pulse train, is applied to the crystal 10 at the junction of the two diodes 12 and 14 through a coupling capacitor 24 and a resistor 26 connected in series therewith. The control signal or gating pulses, indicated generally by the numeral 28, may be the signal which is employed in the receiver to gate the color bursts from the video signal.

A limiter-amplifier includes a transistor 30 having a base 32 connected to a coupling capacitor 34. The other side of the coupling capacitor 34 is connected to the crystal 10 as shown. A shunting resistor 36 is connected between the crystal terminal and ground as shown. The emitter 38 is grounded, and between the base 32 and collector 40 is a small feedback resistor 42. A load resistor 44 is connected between the collector 40 and a DC potential source.

Another amplifier includes a transistor 46, the base 48 being coupled to the collector 40 by means of a coupling capacitor 50. The base 48 is grounded through a resistor 52 and a capacitor 54 connected as shown. The emitter 56 is grounded, and a coupling resistor 58 is connected between the base 48 and collector 60 as shown. A variable capacitor 62 is connected between the collector 60 and ground, and a series-connected variable inductor 64 and resistor 66 are connected between the collector 60 and a source of DC voltage. A bypass condenser 68 is connected between the junction of the inductor 64 and resistor 66 and ground.

In operation, a color information or chroma signal, indicated generally by the numeral 70, is provided in the output circuit of the amplifier 22, this signal 70 including the color synchronizing portion as burst 72 which appears immediately following the horizontal synchronizing pulse. Immediately following the color burst 72 is the usual phase and amplitude modulated chrominance as chroma signal 76.

The gating pulses 28 are time-based and synchronized to coincide with the color burst 72. Thus, when the color burst portion of the composite signal 70 appears on the cathode of the diode 12, the positive-going gate pulses 28 are coupled to the anode of the diode 12, thereby rendering the latter conductive. The color synchronizing burst 72 is thereby conducted to the crystal 10, causing the latter to oscillate or ring.

The same gating pulses 28 are applied to the cathode of the diode 14, rendering it nonconductive and thereby providing a high impedance input circuit to the crystal 10.

Resistor 26 offers a high impedance to the 3.58 megacycle burst signal, thereby preventing it from being bypassed back through capacitor 24 to the flyback transformer from which gating pulses 28 are derived. Due to the rectifier action, a negative charge is developed on the anode of diode 12, which is removed through diode 14 and resistor 16 during the active trace time. This negative voltage places diode 14 in a conducting mode, and any chroma information which is capacity-coupled through diode 12 is bypassed through diode 14 and capacitor 18 to ground. This action corresponds to that of the 3.58 megacycle trap conventionally used in the prior art.

The color burst pulses obtained are used to start the crystal 10 oscillating during retrace time. The conducting action of diode 14 and the bypassing action of capacitor 18 effectively returns the crystal to ground during trace time, thereby providing a high Q crystal-ringing circuit which requires no tuning inasmuch as it is always in phase with the incoming color burst. This eliminates any possibility of any phase errors due to mistuning or any other circuit components such as those used in prior art arrangements.

The crystal 10 is directly coupled to the base of the transistor 30 having a low base input capacity and relatively high gain. By reason of the resistor 42 which is connected between the collector 40 and the base 32, the gain of transistor 30 remains relative constant irrespective of the amplitude of the signal input. Because of this limiting action of the transistor 30, there appears in the output circuit thereof a 3.58 megacycle sinewave of constant amplitude, this sinewave being a duplication of the oscillations generated by the crystal 10. This limited output signal is loosely coupled to transistor

46 through a capacitor 50 and is further amplified and limited for subsequent use by the color-rendering circuits in the color television receiver.

One purpose of the resistor 52 and capacitor 54 is to shunt to ground the horizontal gating pulses which may be coupled to the base 48.

The capacitor 34 and resistor 36 serve the purpose of preventing the horizontal gating pulses which may be coupled through the diode 12 and crystal 10 from driving the transistor 30 to saturation; however, both of these components may be omitted and the crystal 10 connected directly to the base 32 without departing from the spirit and scope of this invention.

It should be noted that this circuit eliminates entirely the prior art crystal-ringing coils., the crystal-tuning coils, and the 3.58 megacycle trap. The use of noninductive elements in this invention in the ringing and amplifier circuits eliminates any phase shift which might otherwise be caused due to mistuning of the prior art coils.

A slight modification of the embodiment shown in FIG. 1 appears in FIG. 2. Like numerals indicate like parts. Connected between the crystal 10 and the base 32 are an inductor 78 and a capacitor 80. These components are connected in series with each other and both are variable. If desired, these components may be used for the purpose of providing a slight phase shift for obtaining an adjustment of the hue rendition. Ordinarily, the inductor 78 is adjusted to find the center point from which the hue can be adjusted by operating the capacitor 80. Alternatively, instead of using the capacitor 80 between the inductor 78 and the base 32, it may be connected between the input circuit of the crystal 10 and ground to obtain the same phase shift adjustment.

Component values for an operating embodiment of this invention are given in the following, it being understood that these values are given by way of example only and not as limitations. Variations may be made within the skill of the art without departing from the spirit and scope of this invention.

| | |
|---|---|
| Diode 12 | GE1N676 Silicon. |
| Diode 14 | GE4JA2XX2005 Germanium. |
| Capacitor 24 | 470 mmfd. (Pf). |
| Resistor 26 | 2.2K. |
| Resistor 16 | 68,000 ohms. |
| Capacitor 18 | 0.1 mfd. |
| Transistor 30, 46 | 200 milliwatt, 200 mc-npn silicon. |
| Resistor 42 | 470,000 ohms. |
| Resistor 44 | 27,000 ohms. |
| Capacitor 50 | 8.2 Pf. |
| Resistor 58 | 560,000 ohms. |
| Resistor 52 | 5,600 ohms. |
| Capacitor 54 | 0.05 mfd. |
| Resistor 66 | 27,000 ohms. |
| Capacitor 68 | .01 mfd. |

While there have been described above the principles of this invention in connection with specific apparatus, it is to be clearly understood that this description is made only by way of example and not as a limitation to the scope of the invention.

I claim:

1. In a color television system, a ringing device having input and output circuits, said device being tuned to the color burst frequency, first means connected to said input circuit for selectively applying the color synchronizing portion of a color burst signal to said device, second means for increasing the Q of said ringing device during intervals between color synchronizing bursts, a noninductive amplifier coupled to said output circuit for amplifying the wave train of the ringing device, and third means for maintaining substantially constant the amplitude of the wave train output of said amplifier irrespective of variations in amplitude of the wave train of said ringing device.

2. The system of claim 1 in which said ringing device is a crystal and said first means is a first unidirectionally conducting device connected to said input circuit, said first means also including circuitry for applying time-based gating pulses to said first unidirectionally conducting device for rendering the latter conductive in time coincidence with the aforesaid color synchronizing portion of said color burst whereby said ringing device is excited into producing a wave train of the same frequency and phase as said color burst.

3. The system of claim 2 wherein said second means includes a second unidirectionally conducting device coupled to said input circuit, said second device having a polarity connection to said input circuit such that said gating pulses are blocked thereby.

4. The system of claim 3 wherein said first and second unidirectionally conducting devices are diodes, the anode of the first device being coupled to said input circuit and the cathode of the second device being connected to said input circuit.

5. The system of claim 4 in which said amplifier is a transistor having base, collector and emitter elements, said base element being connected to said output circuit, said third means including a resistor connected between said base and collector elements for providing a feedback signal from said collector element to said base element.

6. The system of claim 5 in which said crystal is series-connected between said base element and the anode and cathode of said first and second diodes, respectively, said emitter element being grounded, a load resistor series connected to said collector element, a second resistor series-connected between the anode of said second diode and ground, a capacitor connected in shunt across said second resistor, an inductive circuit series-coupled between the cathode of said first diode and ground, said diodes being of the solid-state type, and a series-connected resistor and capacitor connected to the anode and cathode of said first and second diodes, respectively, for coupling the aforesaid gating pulses to said diodes.

7. The system of claim 6 including a series-connected inductor and capacitor series-connected between said base element and said crystal for adjusting the phase of the wave train developed by said crystal.

8. The system of claim 6 including a second amplifier coupled to the collector element of the first-mentioned amplifier, and means in the second amplifier for filtering out the horizontal gating pulses which may be passed by said first-mentioned amplifier.

9. In a color television system, a ringing crystal having input and output circuits, said crystal being tuned to the frequency of the color-synchronizing portions of a color information signal, a first solid-state diode, means coupling the anode of said diode to said input circuit, a source of color information signals, said color information signals including color-synchronizing and chrominance portions, said source being coupled to the cathode of said first diode for applying said color information signal thereto, a source of time-based gating pulses occurring in time coincidence with the color-synchronizing portion of said color information signal, means coupling said pulse source to the anode of said diode for rendering it conductive during the occurrence of said color-synchronizing portion, means coupled to the anode of said diode for inhibiting coupling of the chrominance portion of said color information signal to said crystal.

10. The circuit of claim 9 in which said pulse-coupling means includes a resistor and capacitor in series, said resistor being of a value that reduces coupling of the color information signal back to said pulse source, and said inhibiting means including a semiconductive device coupled between said anode and ground for shunting said chrominance portion to ground.